US006922674B1

(12) United States Patent
Nelson

(10) Patent No.: US 6,922,674 B1
(45) Date of Patent: Jul. 26, 2005

(54) COMPUTER IMPLEMENTED PURCHASING SYSTEM WITH AFTERMARKET PRODUCT INVENTORY DISPLAY

(75) Inventor: Timothy Edward Nelson, Pomona, CA (US)

(73) Assignee: Auto-By-Tel Corporation, Irvine, CA (US)

( * ) Notice: Subject to any disclaimer, the term of this patent is extended or adjusted under 35 U.S.C. 154(b) by 0 days.

(21) Appl. No.: 09/231,898

(22) Filed: Jan. 14, 1999

(51) Int. Cl.$^7$ ............................................. G06F 17/60
(52) U.S. Cl. .............................. 705/26; 705/22; 705/27
(58) Field of Search ............................. 705/26, 27, 22; 706/26, 27, 22

(56) References Cited

U.S. PATENT DOCUMENTS

| | | | | |
|---|---|---|---|---|
| 4,972,318 A | * | 11/1990 | Brown et al. ................ | 364/403 |
| 4,992,940 A | * | 2/1991 | Dworkin ....................... | 705/26 |
| 5,283,731 A | * | 2/1994 | Lalonde et al. .............. | 364/401 |
| 5,592,375 A | * | 1/1997 | Salmon et al. ............... | 395/207 |
| 5,671,279 A | * | 9/1997 | Elgamal ........................ | 380/23 |
| 5,710,887 A | * | 1/1998 | Chelliah et al. ............. | 395/226 |
| 5,842,178 A | * | 11/1998 | Giovannoli ................... | 705/26 |
| 6,009,413 A | * | 12/1999 | Webber et al. ................ | 705/26 |
| 6,032,129 A | * | 2/2000 | Greef et al. ................... | 705/27 |
| 6,041,310 A | * | 3/2000 | Green et al. .................... | 705/27 |
| 6,083,267 A | * | 7/2000 | Motomiya et al. ............. | 703/6 |
| 6,233,609 B1 | * | 5/2001 | Mittal ......................... | 709/219 |
| 6,249,291 B1 | * | 6/2001 | Popp et al. ................... | 345/473 |
| 6,282,517 B1 | * | 8/2001 | Wolfe et al. ................... | 705/26 |

OTHER PUBLICATIONS

Henry, Ed; The Virtual Car Buyer; Kiplinger's Personal Finance Magazine; p145-150, Sep. 1995.*
Conhaim, Wallys W.; Buying cars online; Link-Up; V15; N5, Sep. 1, 1998.*
Electronic Marketplace Report, Automotive Sites Missing Web Ad Oportunities; V10; N22, Nov. 19, 1996.*
Interactive Marketing News; Auto-by-Tel wins educated customers and low prices; V31;N29, Oct. 18, 1998.*
M2Preewire; What Car? TV limited: What car? Online and what car? Text boost manufacture and dealer sales leads.; Aug. 31, 1998.*
PR Newswire Page; Autoweb.com's New Risk-Free Pricing structure revolutionizes online car buying industry; Feb. 9, 1998.*
Nauman, Matt; The virtual showroom car shopping on the web; San Jose Mercury News, Section: Drive; p12; Feb. 7, 1997.*
PR Newswire; Navidec Inc. Announces Third quarter results. Nov. 6, 1997.*
PR Newswire; Navidec Announces "Wheels" launch progress ahead of schedule; Oct. 27, 1997.*
Naughton, Kieth; Revolution in the showroom: Finally, consumers are in the driver's seat and pushy dealers look like dinosaurs; Business Week; n3463; p70; Feb. 19, 1996.*
Business Wire; Lycos and AdOne's Classified Warehouse. com create online alliance . . . ;p1093; Dec. 2, 1998.*
Hickford, Michele; Autoweb.com: Industry leader Autoweb. com revolutionizes online car . . . ; Jan. 31, 1998.*

(Continued)

*Primary Examiner*—Mark Fadok
(74) *Attorney, Agent, or Firm*—Knobbe Martens Olson & Bear LLP

(57) ABSTRACT

A list of aftermarket accessories for a selected vehicle model is displayed for incorporation into a purchase request generated by a potential buyer of the selected vehicle model. The list may be customized by the seller of the selected vehicle model.

4 Claims, 11 Drawing Sheets

OTHER PUBLICATIONS

Washington, Frank S.; Autoweb plans major effort; Automotive News; v71; n5726;p1-6, Aug. 11, 1997.*

Akasie, Jacy; Want to buy a new car? Forbes; v162, n13; p144-148, 9-1995.*

Business Wire, "Cadillac Warehouse Anounces New Web SiteCadilacWarehouse.com" Jul. 1, 1998, pp. 07011134.*

PR Newswire, "Mitsubishi Motors Launches Completely Revamped Internet Web Site", Aug. 25, 1977, pp. 0825LAM065.*

PR Newswire, "Saturn Announces First Wave of Purchase Through Its Interactive Pricing Center on the Internet", Jun. 11, 1997, pp. 0611DEW017.*

Automotive News, "Makers soup up Web sites", Jan. 26, 1998, pp. 46.*

Automotive News, "58 Suburu Dealers on 1 Site", Jun. 8, 1998, pp. 18.*

Hall, Aaron O, Cruise into Gates' online car dealership, Tribune Business weekly; South bend; Aug. 11, 1997, 2 pages.*

My Auto Broker, http:///www.adverlink.com/myautobroker/, dated May 28, 1997.*

PR Newswire, Mitsubishi motors launches completely revamped internet website, pp. 0825lam065, dated Aug. 25, 1997.*

Finlay, Steve, Resist going for accessory kill, Ward's Dealer Business.*

Associated Press, Americans paying to accessorize cars, The Plain dealer, Jul. 9, 1995, pg. 6.G.*

Dealernet1, Gulf toyota selects dealernet as internet provider for 140 dealers, Business wire dated Mar. 12, 1996.*

Dealernet2, Electronic eye, Automotive news, dated Oct. 31, 1994.*

* cited by examiner

EXCLUSIVE DEALER REGIONS RECORD

|  | ZIP CODES | | | |
|---|---|---|---|---|
| VEHICLE MAKE | DEALER IDENTIFICATION NUMBER | | | |
|  |  |  |  |  |
|  |  | DEALER IDENTIFICATION NUMBER | | |
|  |  |  |  |  |
|  |  |  |  |  |

*FIG. 2*

| VEHICLE MAKE | VEHICLE MODEL | VEHICLE YEAR | VEHICLE TYPE | VEHICLE ESTIMATED PRICE | VEHICLE FEATURES | VEHICLE PHOTO | AFTER MARKET ACCESSORIES |
|---|---|---|---|---|---|---|---|
| 402 | 404 | 406 | 408 | 410 | 412 | 414 | 416 |

NEW VEHICLE RECORD

*FIG. 4*

COMPUTER IMPLEMENTED PURCHASING SYSTEM WITH AFTERMARKET PRODUCT INVENTORY DISPLAY

FIELD

The invention is related to systems and methods for conducting transactions using networked computers.

DESCRIPTION OF THE RELATED ART

The global economy has made the business of selling more competitive than ever. Businesses that do not maximize customer satisfaction and profitability may not survive in today's markets. Businesses are therefore demanding tools and methods to provide a competitive edge.

In a conventional sales scenario, a potential customer initiates a purchasing process by visiting a dealership. The customer may make several preliminary visits before making his or her purchasing intent known to the dealer. The customer's manifestation of the purchasing intent to the dealer may be equivalent to the dealer receiving a purchase request.

In the conventional vehicle dealership setting such as a car dealership, the salesperson works on a commission basis. The salesperson's income is directly related to a vehicle's sales price and the number of vehicle sales. Thus, the salesperson will want to be credited for the sale and earn the resulting commission. The conventional vehicle dealership setting may not foster efficient cooperation between the sales staff. Thus, the purchaser may experience frustration and unpleasantness with the purchasing experience.

For example, once a customer is approached by a salesperson, any resulting sale is credited to the salesperson. As far as the purchasing process, the salesperson may be the purchaser's sole dealership contact. The other sales staff may be reluctant to assist either the salesperson or the purchaser in consummating the sale. This inefficiency may ultimately result in customer frustration and a lost sale for the dealership. In this setting, the dealership operates inefficiently in processing the purchase request.

Multi-franchise dealerships are becoming common in today's vehicle marketplace. A multi-franchise dealership sells more than one make of vehicle from a single location and a single sales staff. With the multi-franchise dealer, not all members of the sales staff are equally knowledgeable and qualified to sell all vehicle makes sold by the dealership. For example, one salesperson may be less familiar with vehicle options and available aftermarket products associated with one or more of the vehicle models sold by the dealership.

Thus, in the multi-franchise dealership, a purchaser may be approached by a salesperson less qualified to assist the purchaser in making the purchase. The salesperson may not possess the required product knowledge, or may be too busy to provide the necessary assistance. But, the lack of cooperation between the sales staff, inhibits the purchaser from receiving better assistance and perhaps from receiving prompt and accurate information about a vehicle which assists in the purchasers decision making process. Thus, customer satisfaction is not maximized, and the purchaser may experience unnecessary frustration. This results in dealership inefficiencies and potential lost sales.

SUMMARY

The invention comprises computer implemented methods for initiating sales transactions. In one embodiment the subject of the transaction is merchandise comprising a core product and a plurality of accessories for the core product. In this embodiment the method comprises routing a description of the core product to a potential buyer over a computer network, routing a description of all or a subset of the plurality of accessories to the potential buyer over the computer network, and receiving from the potential buyer a purchase request selecting the core product and one or more of the accessories. In another embodiment, the transaction involves a vehicle and related aftermarket accessories. In this embodiment, the method comprises generating a dealer defined list of aftermarket accessories for a specific model of vehicle, storing the list on a host computer system, receiving at the host computer system a request for information regarding the model vehicle directly from a potential buyer via a computer network, and displaying the list to the potential buyer via the computer network in response to the request.

BRIEF DESCRIPTION OF THE DRAWINGS

These and other aspects, advantages, and novel features of the invention will become apparent upon reading the following detailed description and upon reference to accompanying drawings in which:

FIG. 2 is a representation of one embodiment of an exclusive seller regions look up table of the invention;

FIG. 4 is a representation of one embodiment of a new vehicle record of the invention;

DETAILED DESCRIPTION

Figure 1:
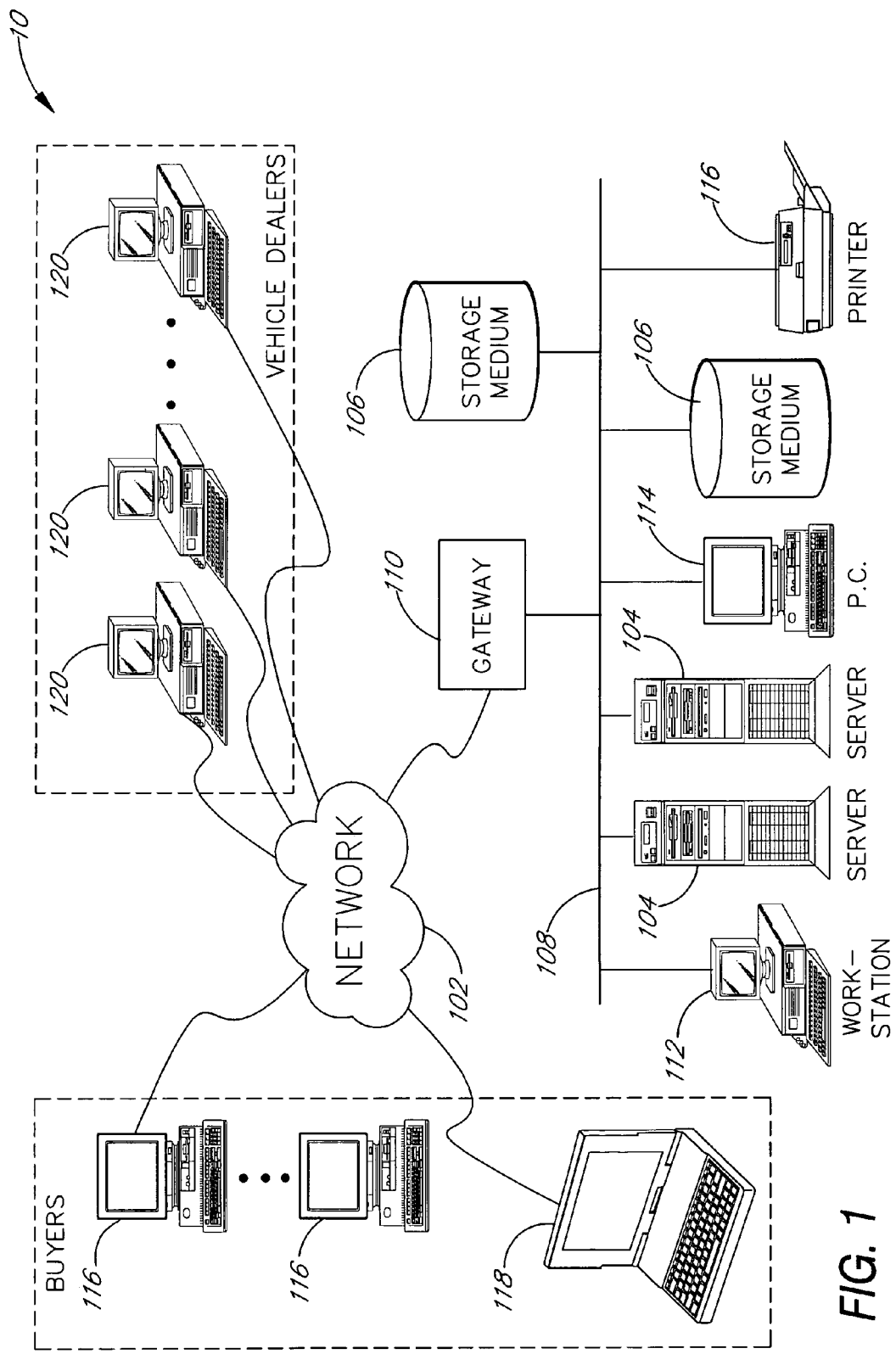
FIG. 1 is a system block diagram illustrating an embodiment of the overall network architecture of the invention.

Embodiments of the invention will now be described with reference to the accompanying Figures, wherein like numerals refer to like elements throughout.

The invention relates to the management of purchase requests made by potential buyers of goods. The purchase requests may be made via a computer network, and the invention finds advantageous application to a computerized purchase request communication system which facilitates a real time communication of a purchase request to a system determined seller.

Although aspects of the invention are suitable for all forms of computer implemented commerce, the invention will be further described in the context of communicating a purchase request for a vehicle in a vehicle sales environment. In this embodiment, a host computer system is used to match potential vehicle buyers with appropriate vehicle sellers. Potential buyers submit "purchase requests" to the system, indicating, among other things, what kind of car they are interested in buying. The buyers' purchase requests are allocated to one or more appropriate vehicle dealers, and the dealers later follow up directly with the buyer, usually with a telephone call placed to the buyer within a short period of time after purchase request submission. It can be appreciated that the proper format and content of an initial purchase request can significantly increase the efficiency of the transaction, and thereby enhance customer satisfaction and dealer profitability.

In one specific application, described in detail below, the system includes a plurality of HTML pages accessible over a network. A potential buyer accesses a first HTML web page over a network such as the World Wide Web (www) using a standard web browser. A participating seller accesses a second HTML page over a network advantageously utilizing a standard web browser and by providing a URL to identify the system. The system further comprises a web server and other program modules which enable to both the buyer and the seller direct and immediate access into a system database. As used herein, "immediately" is understood to mean occurring without loss or interval of time other than the nominal delay necessarily caused by computing components such as microprocessors, memory devices, software and firmware program execution times, and the like.

A participating seller is a seller of goods which has entered into an agreement to participate in the computerized purchase request management system of the invention. The seller is identified by a unique seller record stored in the system database. The seller is further assigned an exclusive database region in the system database. The seller directly accesses its exclusive database region over the network utilizing the system's HTML pages.

The potential buyer uses the system's HTML web pages to formulate and submit a purchase request into a host system, referred to herein as the Data Center system. The just created purchase request is communicated to an appropriate participating seller upon the system storing a purchase request record into the seller's exclusive database region. Details on formulating and submitting a purchase request, identifying a seller, and communicating the purchase request to the seller are included in the commonly owned U.S. patent application entitled REAL TIME COMMUNICATION OF PURCHASE REQUESTS filed on even date herewith, and now U.S. Pat. No. 6,282,517 and which is hereby incorporated by reference in its entirety.

The participating seller is initially assigned a group account in the Data Center system. The seller is given a unique login identification and a password to access the group account. A person associated with the seller logs onto the system utilizing one of the plurality of HTML pages comprising the system and providing the login identification and password. Initially, there are no users set up in the group account. Thus, the person may advantageously establish one or a plurality of users for the group account. Each user created within the seller group is associated with a user profile which filters the information contained in the exclusive database region to be efficiently displayed to the user.

All users in a seller group use the same login identification and password to initially log on to the Data Center system. Having logged on, a user identifies himself or herself to the system by selecting his or her user identification from a displayed list. Details on logging into the system, establishing user profiles, and selecting a user are including in the commonly owned U.S. patent application Ser. No. 09/231,421 entitled A SYSTEM AND METHOD FOR SELECTIVELY RETRIEVING INFORMATION ITEMS filed on even date herewith and which is hereby incorporated by reference in its entirety.

Having successfully logged onto the system, the user is able to access the information stored in its exclusive database region. The plurality of HTML pages comprising the system provide direct and immediate access into the exclusive database region. The direct and immediate access enables the user to be immediately notified of newly created purchase requests along with seller information relating to inventory available for purchase by potential buyers. The immediate notification and direct database access enables the-user to efficiently manage its purchase requests and the inventory on the database.

In one embodiment of the invention, a Data Center system utilizes a database to store dealer information, buyer information, and program logic, for example, to associate the potential buyer to a specific dealer. Additionally, the Data Center system may advantageously include program logic facilitating access between the Data Center system and sources external to the Data Center system over a computer network.

Computer networks suitable for use with the present invention include local area networks (LAN), wide area networks (WAN), Internet, or other connection services and network variations such as the world wide web, the public internet, a private internet, a private computer network, a secure internet, a private network, a public network, a value-added network, and the like. The computers connected to the network may be any microprocessor controlled device that permits access to the network, including terminal devices, such as personal computers, workstations, servers, mini computers, main-frame computers, laptop computers, mobile computers, palm top computers, hand held computers, set top box for a TV, or a combination thereof. The computers may further possess input devices such as a keyboard or a mouse, and output devices such as a computer screen or a speaker. The computer network may include one or more LANs, WANs, Internets, and computers. The computers may serve as servers, clients, or a combination thereof.

One network architecture which may be used with one embodiment of the invention is indicated generally by a system 10 in FIG. 1. The system 10 may include a network 102, which represents a computer network as previously described, providing access to and from the Data Center system.

In one embodiment of the invention, the Data Center programs and Data Center databases comprising the Data Center system preferably reside on one or more Data Center servers 104 and one or more Data Center storage mediums 106. The Data Center servers 104 and Data Center storage mediums 106 may be interconnected by a LAN 108 and a gateway 110 to the network 102. The gateway 110 facilitates access to the Data Center system from the network 102.

One example of the LAN 108 may be a corporate computing network, including possible access to the Internet, to which computers and computing devices comprising the Data Center system are connected. In one embodiment, the LAN 108 conforms to the Transmission Control Protocol/Internet Protocol (TCP/IP) industry standard. In alternative embodiments, the LAN 108 may conform to other network standards, including, but not limited to, the International Standards Organization's Open Systems Interconnection, IBM's SNA®, Novell's Netware®, and Banyon VINES®.

Those of ordinary skill in the art will recognize that the Data Center programs, the Data Center databases, and gateway functionality may advantageously be implemented on one or more computers. These computers may be uniprocessor or multiprocessor machines. Additionally, these computers include an addressable storage medium such as random access memory and may further include a non-volatile storage medium such as a magnetic or an optical disk.

In accordance with one embodiment of the invention, the Data Center server 104 is connected to the Internet and utilizes at least a first user web page remotely accessible by a potential buyer. This user web page permits the potential buyer to enter the necessary buyer and product information into the Data Center system. In another embodiment, the Data Center server 104 utilizes a second HTML page accessible by an authorized dealer. The authorized dealer utilizes this web page to access the Data Center system and features as further detailed herein. Those of ordinary skill in the art will recognize that a single web page may be used to provide both remote buyer and dealer access to the Data Center system. Further, access for a remote buyer could be through an entirely different network than that used for access by the dealer.

In one embodiment, the Data Center storage medium 106 may be configured as a database from which information can be both stored, updated, and retrieved. For example, the database may conform to the SQL standard. In an alternative embodiment, the database may conform to any database standard, or may even conform to a non-standard, private specification. The Data Center programs may provide access to the information stored on the Data Center storage medium 106. The Data Center storage medium 106 may be accessed by devices such as clients, servers, workstations, personal computers, and the like, connected to the network 102 or the LAN 108.

In one embodiment, the Data Center storage medium 106 comprises exclusive database regions. The Data Center assigns each participating dealer an exclusive database region. In another embodiment, the exclusive database regions may be created by segmenting the storage media into distinct areas, with each area assigned to a dealer. These areas or regions could be dynamically allocated by the computer depending on the amount of data to be stored as the data is entered. In another embodiment, the collection of information associated with a dealer advantageously comprises the exclusive database region for the dealer. The exclusive database region may only be accessed by the assigned dealer and the Data Center system programs.

In another embodiment, the Data Center programs may transfer the information stored on the Data Center storage medium 106 to sources external to the Data Center system. For example, vehicle inventory information may advantageously be transferred to other third-party computers connected to the network 102. A potential buyer can then access the third-party computer to view vehicle data. In yet another embodiment, the potential buyer may also submit a vehicle purchase request from the third-party computer.

Various other devices may be connected to the LAN 108. For example, a workstation 112 and a personal computer 114 may be connected to the LAN 108 to provide access to the Data Center programs and Data Center databases. In one embodiment, a printer 117 may also be connected to the LAN 108 providing local and remote printing capabilities.

The network 102 may connect devices, such as a user computer 116 or a user laptop 118, for example, by use of a modem or by use of a network interface card. As illustrated, potential buyers, may utilize such devices to remotely access the Data Center system via the network 102. A buyer may advantageously use such a device, collectively known as buyer terminals, to access the first user web page of the Data Center server 104 to create and submit a purchase request into the Data Center. The Data Center stores the purchase request directly into a dealer's database region.

A plurality of dealer computers 120 may also be connected to the network 102 through a modem or other network connection device. A vehicle dealer may advantageously use the dealer computer 120 to remotely access the Data Center system. The dealer obtains entry into the Data Center by logging in through the second HTML page of the Data Center server 104. Upon logging in, the dealer attains direct access to its exclusive database region and the contents thereof. Moreover, because a purchase request is directly stored in a dealer's database region, the dealer is immediately made aware of any newly created purchase request.

Although particular computer systems and network components are shown, those of ordinary skill in the art will appreciate that the present invention also works with a variety of other networks and components.

In one embodiment, for new vehicle sales, each zip code is an exclusive territory for a given make of vehicle. Thus, a particular dealer is advantageously assigned an exclusive sales region based upon a vehicle make and a zip code. If a new vehicle purchase request is submitted, for example, for a vehicle make A in zip code 99999, then the dealer assigned to zip code 99999 for the vehicle make A will be notified of the new vehicle purchase request. In one embodiment, a particular dealer may be assigned multiple vehicle makes as well as multiple zip codes. In another embodiment, sales regions need not be based upon zip codes. Other factors such as, by way of example, telephone area codes, cities, and counties, may advantageously provide the basis for determining sales regions.

In an alternative embodiment, one or a plurality of dealers may be assigned to a single sales region. Here, if a new vehicle purchase request is submitted, for example, for a vehicle make B in a zip code 88888, then the plurality of dealers assigned to zip code 88888 for vehicle make B will all be notified of the new vehicle purchase request.

For used vehicles, the territories are advantageously not exclusive. The dealer and buyer may separately specify a search radius. For example, each dealer may specify a search radius indicating that the dealer's used vehicles are to be offered for sale to potential buyer's within the specified geographic radius from the dealer location. This could be done, for example, by utilizing zip codes to represent the area from which the dealer would accept buyers. Similarly, the buyer may specify a search radius indicating the desire to purchase a used vehicle from a dealer within the specified geographic radius from the buyer location. Thus, both the buyer's and the dealer's search radius must overlap before a potential vehicle match is considered.

The dealer and the buyer may simply specify large geographic regions, such as states, counties, or zip codes, and only those dealers and buyers within the geographic region specified by both are considered to determine a potential vehicle match. Thus, if a dealer specifies New York and New Jersey as its sales region and a buyer accesses the Data Center from Pennsylvania, then the dealer's used vehicles would not be considered for a potential sale.

Likewise, if a buyer specifies an intent to purchase from New York, a Texas dealer will not be considered. In some embodiments, the system may accommodate a number of defined geographic regions for a dealer, whereby the dealer may have different regions specified for different types of cars. Classic, rare, or especially expensive cars may have a larger radius associated with them than other vehicles the dealer may sell.

FIG. 2 illustrates an example of a record of exclusive dealer regions suitable for use with one embodiment of the invention. Advantageously, the record of exclusive dealer regions may be implemented as a matrix. The matrix may be stored in the Data Center storage medium 106. Along the horizontal axis may be listed all the regions according to selected geographic areas. In one advantageous embodiment described above and also illustrated in FIG. 2, zip codes are utilized to define exclusive dealer regions.

Along the vertical axis may be listed all the available vehicle makes. Each matrix cell 202 may contain a dealer identification number uniquely identifying a dealer. In this manner, each region, and each vehicle make for that region, may be assigned to a unique dealer.

Figure 3:
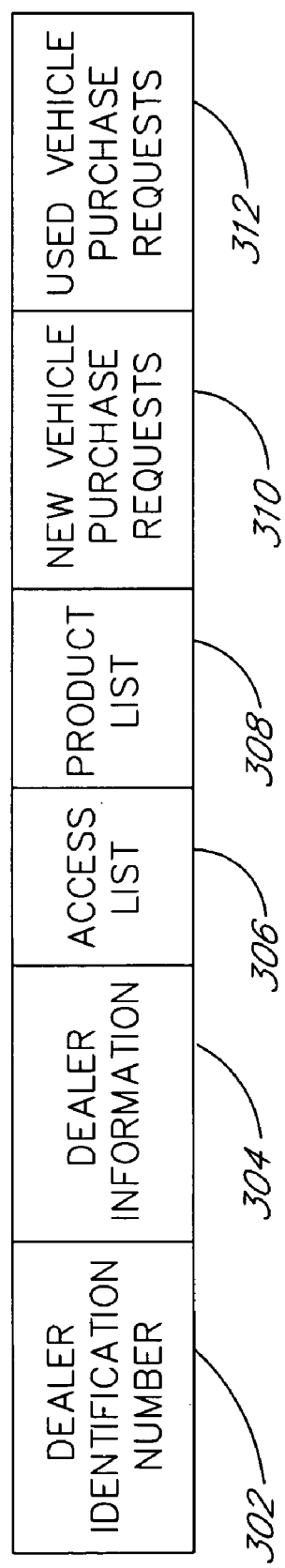
FIG. 3 is a representation of one embodiment of a dealer record of the invention.
Figure 5:
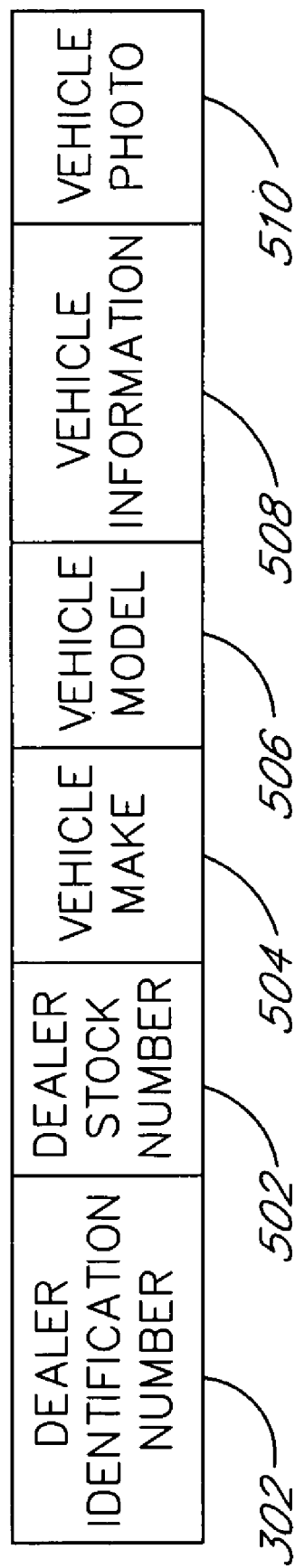
FIG. 5 is a representation of one embodiment of a used vehicle record of the invention.

FIGS. 3, 4, and 5 illustrate information concerning vehicle dealers and associated vehicles which may be stored on the storage medium 106 of the Data Center system. FIG. 3 illustrates an example of a dealer record according to one embodiment of the invention. Each dealer eligible- to sell through the Data Center system is assigned a dealer record. The dealer record may be stored in the dealer's exclusive database region in the Data Center storage medium 106. By way of example, six fields are illustrated comprising the dealer identification number 302, dealer information 304, access list 306, product list 308, new vehicle purchase requests 310, and used vehicle purchase requests 312. One of ordinary skill in the art will realize that any number of the fields may be broken down into additional sub-fields and that additional fields could be added.

In one embodiment, the dealer information 304 may be comprised of additional fields such as, for example, a dealer name, dealer address, dealer group, and the like. Furthermore, any of the dealer record fields may be implemented as pointers to other fields or other data records. For example, the product list 308 may point to a list of new vehicle model records indicating the new vehicle models offered for sale by the dealer.

FIG. 4 illustrates a new vehicle record suitable for use with the invention. Seven fields are illustrated comprising a vehicle make 402, vehicle model 404, vehicle year 406, vehicle type 408, vehicle estimated price 410, vehicle features 412, vehicle photo 414, and vehicle aftermarket accessories 416. It should be understood that appropriate fields may be added and a field may contain additional sub-fields. The vehicle make field 402, model field 404, and year field 406 specify a specific vehicle such as a 1999 Jeep Grand Cherokee. The vehicle type field 408 may specify whether the vehicle is a passenger car, a luxury car, a sports car, or the like.

The vehicle features field 412 may advantageously be comprised of a standard features field and an optional features field. In another embodiment, each new vehicle model record may further point to a vehicle model specifics record and a vehicle model accessories record. The vehicle features field 412 will include those features and options which are available as part of or with the vehicle from the vehicle manufacturer directly. Thus, the vehicle model specifics record may identify the vehicle model specifics such as available transmission type, available number of doors, and the like. The vehicle model accessories record may identify the accessories such as leather seats, power windows, and the like, available for the vehicle model. In an alternative embodiment, the vehicle model specifics record contents and the vehicle model accessories record contents may be appropriately displayed in a web page. The buyer may then specify the desired vehicle specifics and the desired vehicle accessories.

In another embodiment, the new vehicle record fields may be implemented as pointers to other fields or other records. For example, the vehicle photo field 414 may be implemented as a pointer pointing to a representative photo of the new vehicle. Thus, the representative photo may advantageously be stored in a different region in the Data Center storage medium 106. In yet another embodiment, the vehicle year field 406 may be implemented as a pointer pointing to one or a plurality of records, each record containing, for example, a year field, a type field, an estimated price field, a features field, a photo field, and the like.

In one embodiment, each new vehicle model record may in turn either include or point to a list of aftermarket accessory products, shown in FIG. 4 as the aftermarket accessory field 416. Aftermarket accessories on the list will typically comprise options and features which may be added to a vehicle but which are not provided by the vehicle manufacturer. These items may include products such as special rims or tires, pinstriping, floormats, stereo equipment, special lights, alarm systems, etc. Services such as extended warranties may also be offered in this way as aftermarket accessories. The aftermarket product record may be comprised of an aftermarket product, a retail price for the product, and a discounted price for the product. These aftermarket product records associated with each vehicle make and model may be updated and displayed to potential buyers as explained below with reference to FIG. 7.

In one embodiment, a new vehicle database may be comprised of a list of new vehicle records which may be stored in the Data Center storage medium 106. Each new vehicle model available for purchase through the Data Center system is associated with a new vehicle record.

A used vehicle record identifies a used vehicle, and is created for each used vehicle offered for sale through the Data Center system. The collection of used vehicle records comprise a used vehicle inventory. The used vehicle records may be stored in the Data Center storage medium 106. For example, the used vehicle inventory may be comprised of a linked list of used vehicle records.

FIG. 5 illustrates an example of a used vehicle record suitable for use with one embodiment of the invention. Six fields are illustrated comprising the dealer identification number 302, a dealer stock number 502, vehicle make 504, vehicle model 506, vehicle information 508, and vehicle photo 510. Although the used vehicle record of this embodiment does not include an aftermarket accessories field, it will be appreciated that such a field may be associated with used vehicles as well as new vehicles if desired. One of ordinary skill in the art will realize that appropriate fields may be added and any number of the fields may be broken down into additional sub-fields. Furthermore, any of the fields may be implemented as pointers to other fields or other data records. For example, the vehicle photo field 510 may advantageously point to an image of the vehicle stored elsewhere in the Data Center database.

Figure 6:
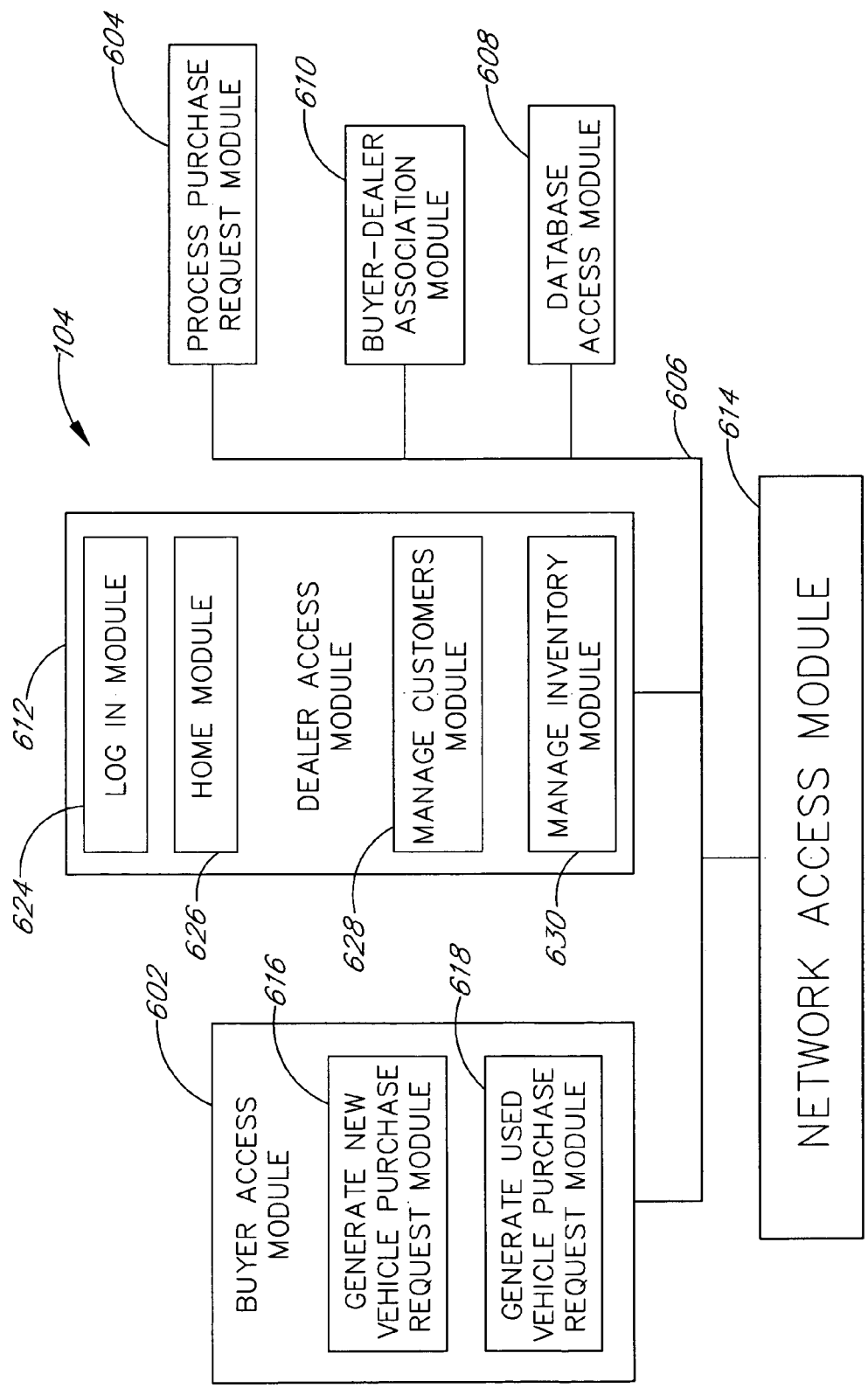
FIG. 6 is a high level block diagram illustrating one embodiment of a Data Center server system architecture of the invention.

FIG. 6 illustrates in more detail selected components of the Data Center server 104 of FIG. 1 suitable to implement one embodiment of the present invention. The Data Center server 104 includes a buyer access module 602 connected along a communications path 606 to a process purchase request module 604. Also connected to the communications path 606 is a database access module 608, a buyer-dealer association module 610, a dealer access module 612, and a network access module 614.

The communications path 606 facilitates communication amongst the modules comprising the Data Center server 104 (FIG. 1). The communications path 606 may be implemented as a procedure or a function call interface. In an alternative embodiment, the communications path 606 may be implemented as an interprocess communication method. For example, the modules comprising the Data Center server 104 may be implemented as one or a plurality of software processes. The various software processes may then communicate with one another by means of interprocess communication. Those of ordinary skill in the art will realize that the modules comprising the Data Center server 104 may be distributed amongst a plurality of Data Center servers 104 utilizing well known distributed technology techniques.

The buyer access module 602 provides a purchase request entry system. In one embodiment, the purchase request entry system may facilitate a data entry environment for a buyer to enter a purchase request for a requested vehicle into the Data Center system. The buyer access module 602 may be comprised of a generate new vehicle purchase request module 616 and a generate used vehicle purchase request module 618. The generate new vehicle purchase request module 616 and the generate used vehicle purchase request module 618 may advantageously be implemented as a plurality of web pages.

In one embodiment, the web pages may advantageously be implemented in hypertext or hypermedia. Thus, the web pages may contain one or a plurality of selectable items or links. The links may provide access to other web pages contained in the Data Center system. The plurality of linked web pages guides the user in entering the necessary data to formulate and submit either a new vehicle purchase request or a used vehicle purchase request.

In another embodiment, the links may provide access to any location in the World Wide Web. For example, a link may exist to third-party web sites which advantageously provide additional product information.

The generate new vehicle purchase request module 616 facilitates a new vehicle purchase request formulation and submission process. A potential buyer utilizes at least a first web page in the generate new vehicle purchase request module 616 and provides information from which the process purchase request module 604 formulates a new vehicle purchase request. Likewise, the generate used vehicle purchase request module 618 facilitates a used vehicle purchase request formulation and submission process through its web pages. There may be a one-to-one correlation between a purchase request and a purchase request record.

The process purchase requests module 604 may generate either a new vehicle purchase request record or a used vehicle purchase request record. The new vehicle purchase request record may be generated from the information supplied through the plurality of web pages utilized during the new vehicle purchase request formulation and submission process. In one embodiment, the buyer information gathered through the plurality of web pages comprising the generate new purchase request module 616 is input to the process purchase request module 604. The process purchase request module 604 formulates a new vehicle purchase request record from this information. The used vehicle purchase request record may likewise be generated from the information supplied through the plurality of web pages utilized during the used vehicle purchase request formulation and submission process. In another embodiment, the purchase request information may also be obtained from web pages external to the Data Center system.

The buyer-dealer association module 610 associates a purchase request and an appropriate dealer. In one embodiment, the buyer-dealer association module 610 may receive purchase request information from the process purchase request module 604 via the communications path 606. The buyer-dealer association module 610 may then access the Data Center storage medium 106, utilizing the database access module 608 and the network access module 614, to determine the appropriate dealer for the purchase request. In one embodiment, as previously stated, the buyer-dealer association module 610 may advantageously determine an appropriate dealer to receive the purchase request from the vehicle make and the buyer zip code.

The database access module 608 provides an interface to the information stored on the Data Center storage medium 106. The database access module 608 thus enables the modules of the Data Center server 104 to be implemented independent of the specifics of the Data Center storage medium 106. This enables the Data Center storage medium 106 specification to be altered without impacting the various modules, other than the data base access module 608, comprising the Data Center server 104.

In one embodiment, as previously mentioned, the Data Center storage medium 106 may be configured as a SQL database. The database access module 608 implements the specifics of the SQL commands to interact with the Data Center storage medium 106. Thus, other modules comprising the Data Center server 104 may be developed independent of the SQL specifics. For example, if the Data Center storage medium 106 is re-developed as a DB2 database, only the database access module 608 needs to be updated. The other modules comprising the Data Center server 104 need not be re-developed.

The network access module 614 provides the modules of the Data Center Server 104 (FIG. 1) a uniform interface to the LAN 108. In one embodiment, the network access module 614 may be implemented as an application program interface. The network access module 614 enables the modules of the Data Center server 104 to be implemented independent of the underlying network specifics. Thus, the underlying network specifics may be altered without impacting the various modules, other than the network access module 614, comprising the Data Center server 104.

The dealer access module 612 facilitates the interaction between a participating dealer and the Data Center system. More particularly, a dealer may directly access its exclusive database region, and the information contained therein, by logging into the Data Center system. In one embodiment, the dealer access module 612 may be implemented as a plurality of HTML pages providing the dealer a mechanism to access its exclusive database region. The Data Center system may advantageously communicate to the dealer its purchase requests through one or a plurality of the HTML pages. The dealer may also advantageously perform real time operations such as, purchase request management, inventory management, and the like, through the plurality of HTML pages. Thus, the dealer access module 612 may also comprise a login module 624, a home module 626, a manage customers module 628, and a manage inventory module 630. These modules may be comprised of one or a plurality of linked HTML pages which enable the participating dealers to interact with the Data Center system.

The manage inventory module 630 advantageously performs two major functions. First, it allows dealer creation and alteration of individual vehicle records such as are described above with reference to FIGS. 4 and 5. This function is described in additional detail in co-pending patent application COMPUTER IMPLEMENTED PURCHASING SYSTEM WITH AVAILABLE INVENTORY MANAGEMENT FUNCTIONS mentioned above.

Second, it allows dealer creation and alteration of the aftermarket accessory product lists associated with a given vehicle make and model which are mentioned above with reference to the new vehicle record of FIG. 4. The creation and display of these lists is illustrated in FIG. 7.

Figure 7:
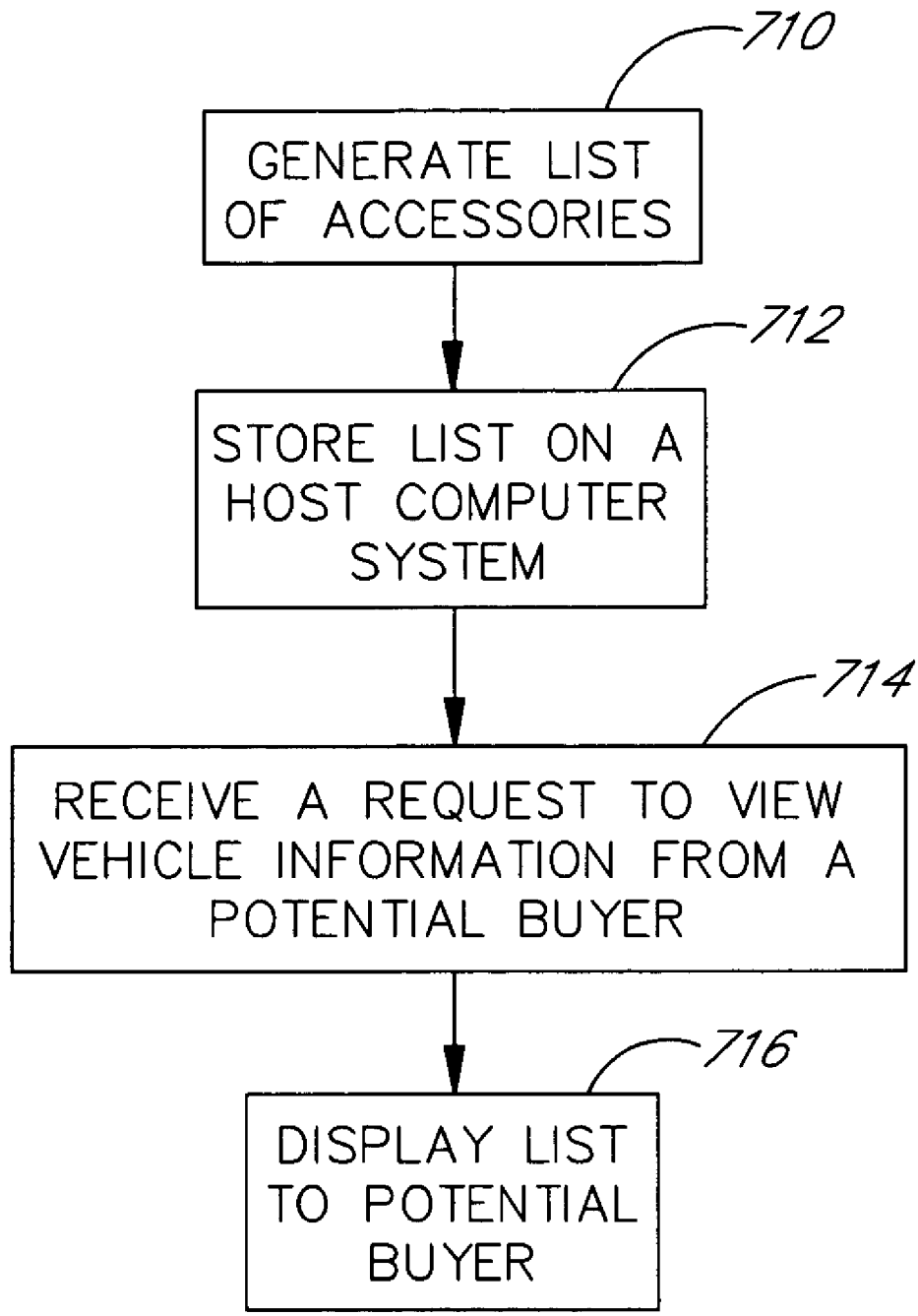
FIG. 7 is a flow chart illustrating the model specific display of aftermarket accessories to potential vehicle buyers.

Referring now to FIG. 7, aftermarket accessory management by the system begins at block 710 where a list of aftermarket accessories which the dealer wishes to offer a potential buyer is generated. In one embodiment, this list creation-may be implemented via prompts and entry fields on HTML pages which are selected and filled in by the dealer. In one advantageous embodiment, a given vehicle make and model will have its own associated aftermarket product list. For instance, a dealer may select an "add aftermarket items" prompt on a system HTML page. The dealer may then select a model vehicle, and be presented with several fields in which to enter information about an aftermarket item the dealer wants to sell with that vehicle model. When the information fields are completed, the aftermarket item can be added to the list of aftermarket accessories associated with that vehicle model. For additional flexibility, the system may include HTML pages allowing a dealer to view an aftermarket accessories list associated with a selected vehicle model, and to modify or delete existing entries on the list. Thus, the list of aftermarket accessories associated with a vehicle model may be generated and customized by the dealer.

As illustrated by block 712, the list of aftermarket accessories is stored on the host Data Center system. As mentioned above with reference to FIG. 4, aftermarket accessories on the list will typically comprise options and features which may be added to a vehicle but which are not provided by the vehicle manufacturer.

At block 714, a potential buyer may request information over a computer network such as the Internet regarding a specific make and model vehicle. This may occur when the potential buyer is formulating a purchase request for a new vehicle, a process described in more detail below with reference to FIGS. 8 and 10. As described above, the system may match this potential buyer with an exclusive seller designated to service buyers from that buyer's geographic area. This seller will have a set of vehicle records describing particular makes and models of vehicle, and these records may further be associated with a list of available aftermarket accessories. Thus, at block 716, the list of aftermarket accessories for the vehicle is displayed to the potential buyer over the computer network in response to the buyer's request, and along with information about the vehicle model itself. As will be described in further detail below, the potential buyer may complete the purchase request by selecting one or more aftermarket accessories off of the list which was generated by the dealer. This transaction format increases the efficiency of the car buying process by allowing potential buyers to express their purchasing desires with respect- to both a vehicle and associated aftermarket accessories over a network communication without requiring personal dealer-customer contact.

Figure 8:
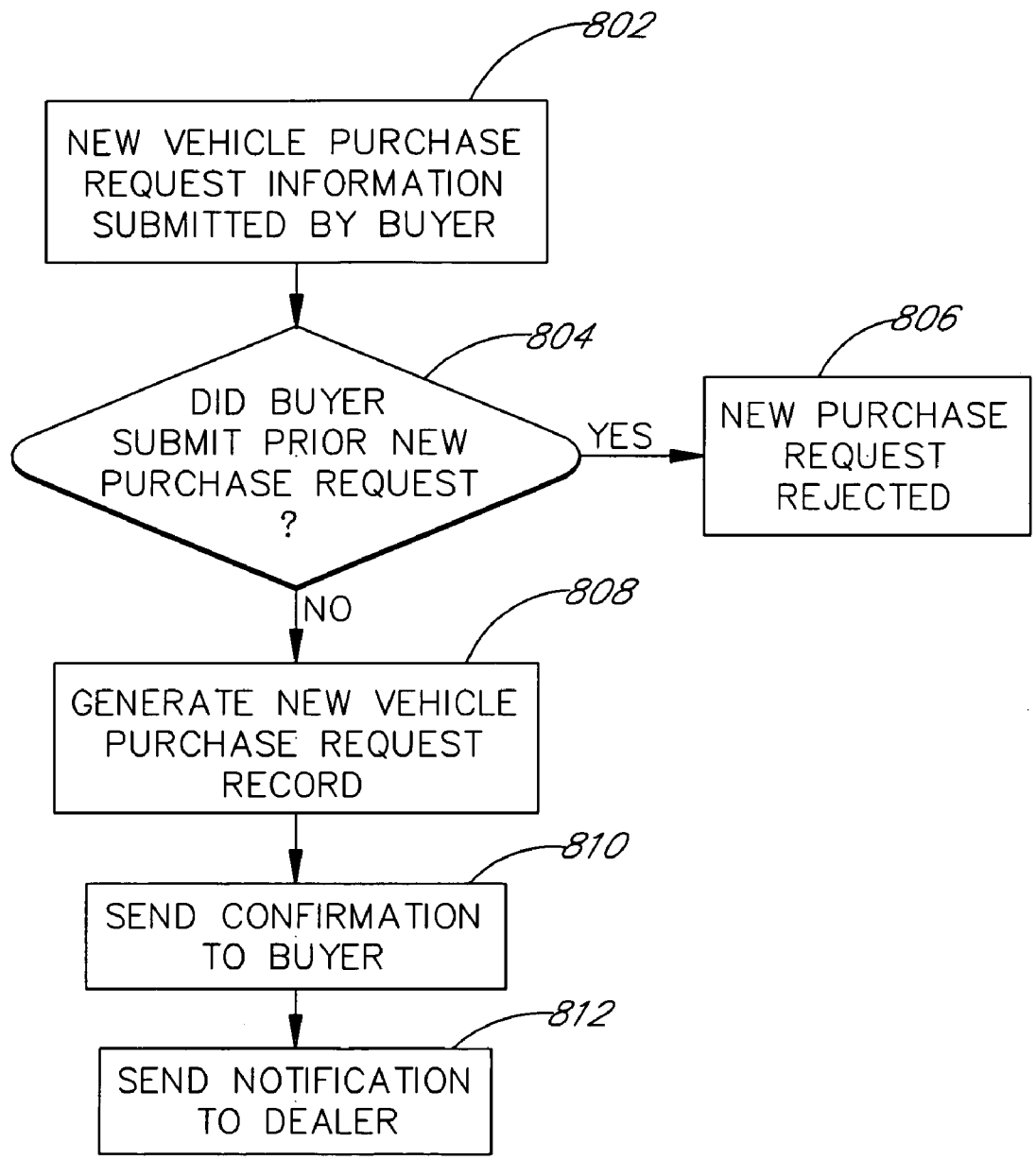
FIG. 8 is a flow chart illustrating a real time new vehicle purchase request submission and delivery process in accordance with one embodiment of the invention.

Turning now to the details of the purchase request process, FIG. 8 is a flow chart generally illustrating a real time new vehicle purchase request submission and communication process according to one embodiment of the invention. In particular, at a step 802, the new vehicle purchase request information is submitted by the buyer. The buyer may utilize the generate new vehicle purchase request module 616 to submit the information pertaining to the new vehicle purchase request. In one embodiment, the buyer information may be passed to the process purchase request module 604 as the buyer information is entered through each web page, or soon thereafter. In another embodiment, the buyer-dealer association module 610 determines the appropriate dealer from the record of exclusive dealer regions once the buyer enters a requested vehicle model and a buyer zip code, or soon thereafter.

Once the buyer information is entered, the Data Center system moves to a step 804 wherein a check is performed to determine if the buyer has previously submitted a new vehicle purchase request within the previous 48 hours. In one embodiment, a list of new vehicle purchase request records may be searched to determine if the buyer has previously submitted a new vehicle purchase request. In another embodiment, the list of new vehicle purchase request records may be sorted based on the submit time stamp. Thus, only the new vehicle purchase request records submitted within 48 hours need to be searched. In yet another embodiment, the list of new vehicle purchase request records may further be sorted according to dealer identification number, thus requiring a search of even a smaller number of new vehicle purchase request records.

In one embodiment, in step 804, a buyer address may be used as the criteria for determining if the buyer previously submitted a new vehicle purchase request within the past 48 hours. If the buyer previously submitted a new vehicle purchase request, then the Data Center system moves to step 806 and rejects the present new vehicle purchase request. Also, the buyer may be presented with an error message indicating the rejection of the newly submitted purchase request.

If the buyer has not submitted a new vehicle purchase request within the prior 48 hours, the Data Center system moves to a step 808 wherein a new vehicle purchase request record is created by the process purchase request module 604 and is stored in the appropriate dealer's exclusive database region in the Data Center storage medium 106. In one embodiment, the process purchase request module 604 may generate a unique number to identify the new vehicle purchase request record. This unique number may be associated with the new vehicle purchase request identification number field 1002 illustrated in FIG. 10 below. The Data Center system then moves to step 810 wherein a confirmation is sent to the buyer. For example, the confirmation may be a web page displaying the purchase request number. At a step 812, the new vehicle purchase request record is added to the appropriate dealer database region for access by the dealer.

Figure 9:
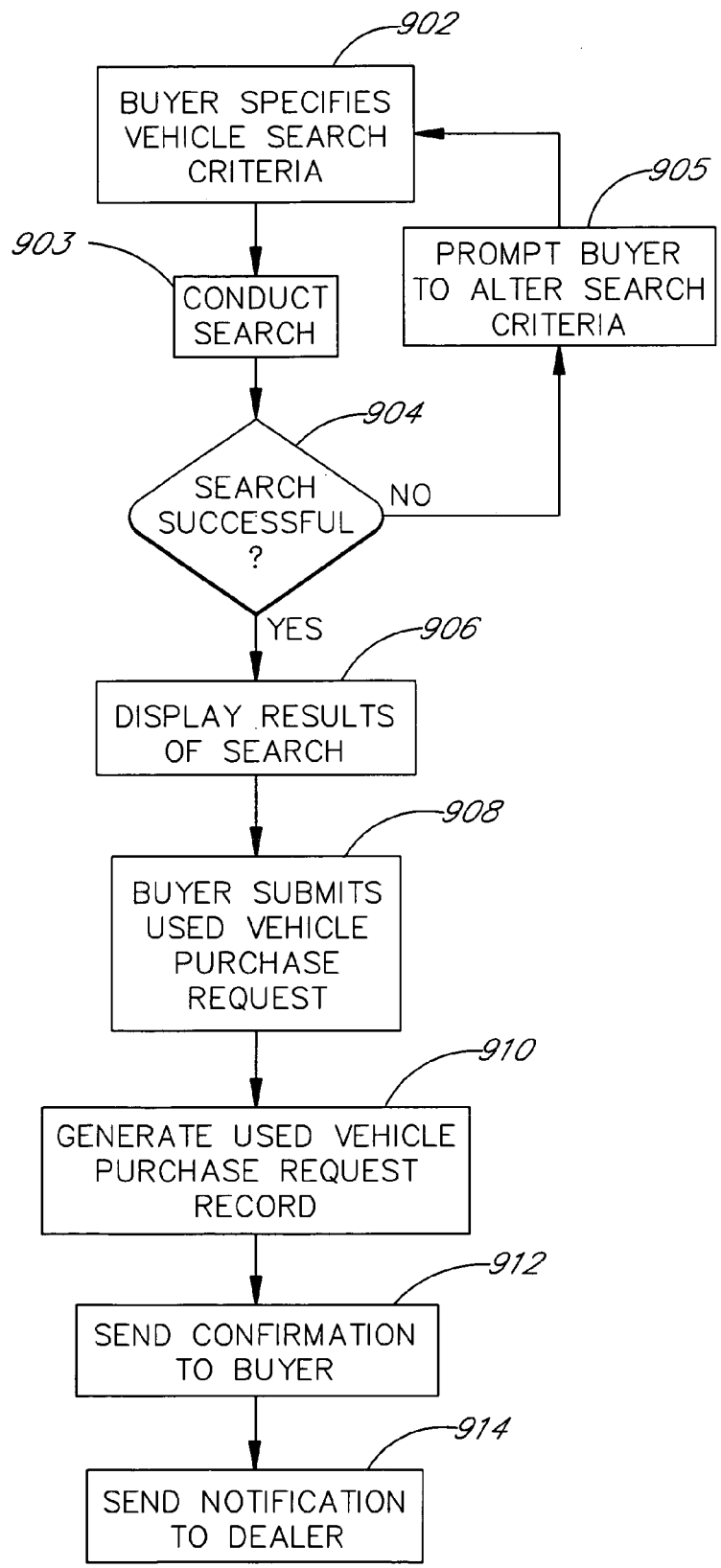
FIG. 9 is a flow chart illustrating a real time used vehicle purchase request submission and delivery process in accordance with one embodiment of the invention.

FIG. 9 is a flow chart generally illustrating a real time used vehicle purchase request submission and delivery process according to one embodiment of the invention. In particular, at a step 902, the buyer may submit information generally describing a vehicle. To do this, the buyer uses the generate used vehicle purchase request module 618. In one embodiment, the buyer may specify information such as a vehicle make, a vehicle model, and the like.

Once the buyer submits his or her search criteria, which generally describes the vehicle, the Data Center system moves to a step 903 and conducts a search, based on the submitted search criteria, of the used vehicle records comprising the used vehicle inventory in the Data Center storage medium 106. In one embodiment, the generate used vehicle purchase request module 618 may utilize the database access module 608 to perform the search. If the search is unsuccessful at step 904, the Data Center system moves to a step 905 wherein the buyer is prompted to alter the search criteria. The Data Center system then moves to step 902 and functions as described above.

In one embodiment, if it is determined in step 904 that the search was successful, the Data Center system moves to step 906 wherein the results of the search are displayed to the buyer. In this step, the buyer may also view a more detailed description of one or more vehicles found in the search. Having decided on an appropriate vehicle, the buyer may formulate a purchase request for that vehicle which is submitted to the Data Center system at a step 908.

At a step 910, the process purchase request module 604 creates a used vehicle purchase request record in the appropriate dealer's exclusive database region in the Data Center storage medium 106. In this step, the buyer-dealer association module 610 may determine the dealer offering the used vehicle for sale. In one embodiment, the process purchase request module 604 may generate a unique number to identify the used vehicle purchase request record. This unique number may be associated with the used vehicle purchase request identification number field 1102 illustrated in FIG. 11 below.

In one embodiment, a confirmation is sent to the buyer at a step 912. For example, the confirmation sent may be a web page displaying the purchase request number. At a step 914, the used vehicle purchase request record is stored and identified in a manner similar to a new vehicle purchase request record. Thus, the purchase request is communicated to the dealer in real time. Consequently, the dealer may appropriately act on the purchase request upon its submission, or shortly after.

Figure 10:
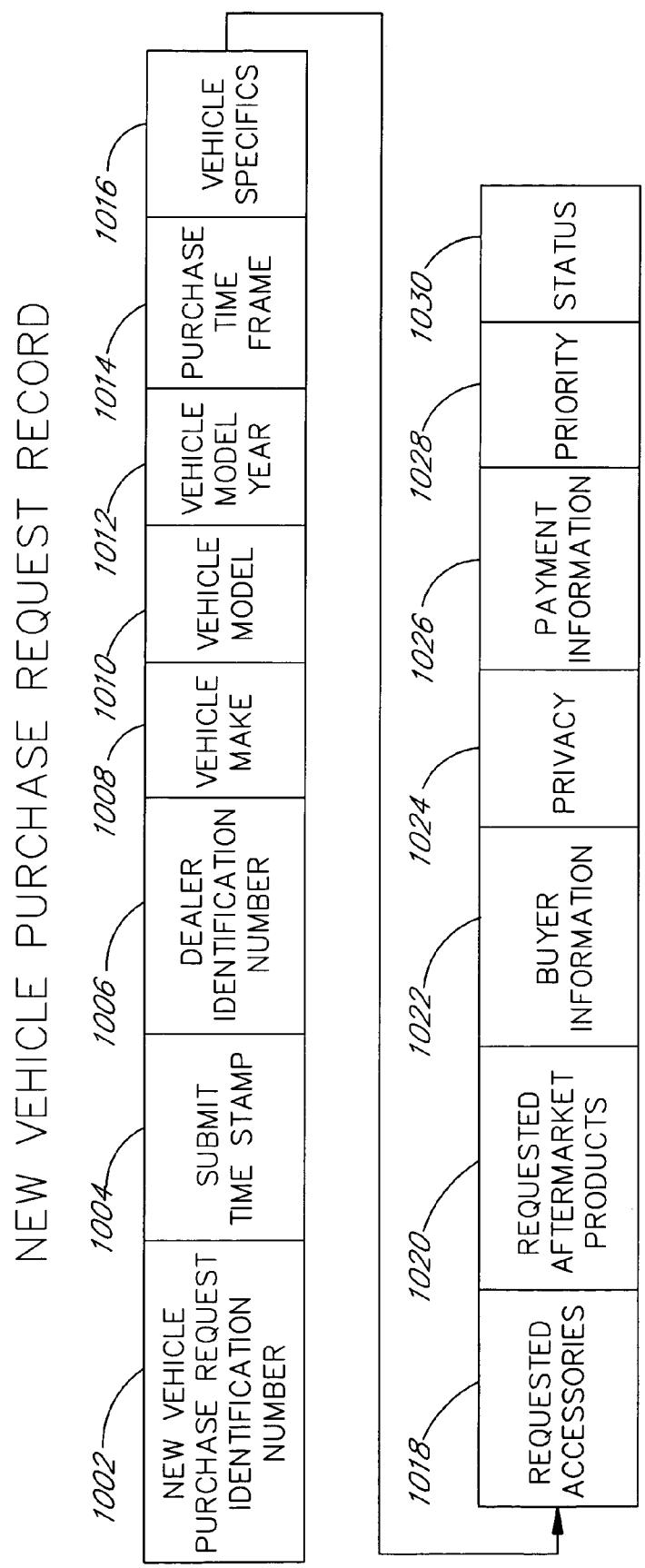
FIG. 10 is a representation of one embodiment of a new vehicle purchase request record of the invention.

FIG. 10 illustrates a set of information fields comprising a new vehicle purchase request record according to one embodiment of the invention. Fifteen fields are illustrated comprising new vehicle purchase request identification number 1002, submit time stamp 1004, dealer identification number 1006, vehicle make 1008, vehicle model 1010, vehicle model year 1012, purchase time frame 1014, vehicle specifics 1016, requested accessories 1018, requested aftermarket products 1020, buyer information 1022, privacy 1024, payment information 1026, priority 1028, and status 1030. It should be understood that some of these fields include several sub-fields. Thus, for example, the buyer information field 1022 may include sub-fields for name, address, zip code, e-mail address, phone numbers, and contact preference. The new vehicle purchase request record may advantageously be stored in the Data Center storage medium 106.

In one embodiment, the information fields may be implemented as pointers to other fields or other records containing the information. For example, the buyer information 1022 may be implemented as a pointer. The pointer may point to a record comprised of, for example, the name, address, zip code, e-mail address, phone numbers, and contact preference. Those of ordinary skill in the art will realize that any combination of the information fields may be implemented as pointers.

In another embodiment, certain information fields may be implemented as encoded fields. For example, the requested accessories field 1018 may be implemented as a binary encoded field. Each bit position may coincide with a vehicle accessory such as an AM/FM radio, power windows, tilt wheel, overhead console, and the like. For example, a "1" in the first bit position may indicate the selection of an AM/FM Radio accessory.

Figure 11:
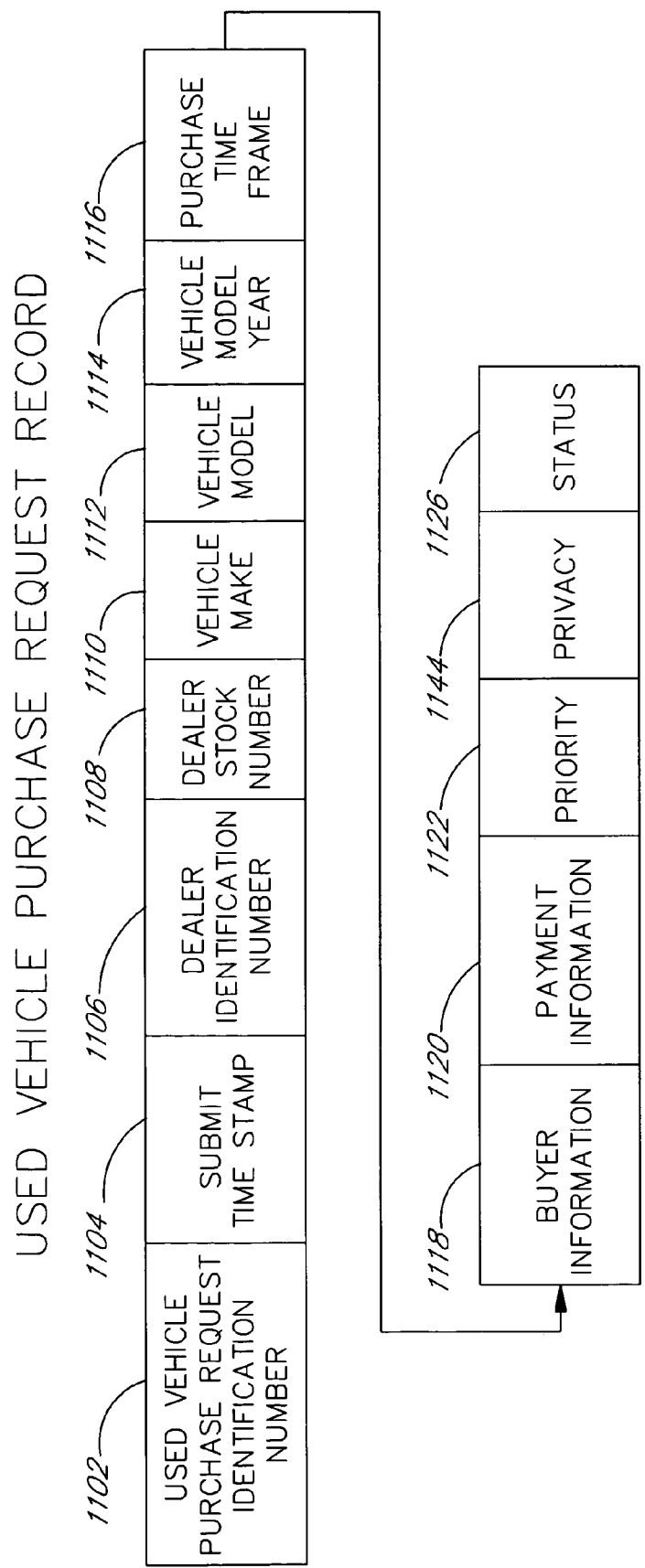
FIG. 11 is a representation of one embodiment of a used vehicle purchase request record of the invention.

FIG. 11 illustrates a used vehicle purchase request record suitable for use with one embodiment of the invention. Thirteen fields are illustrated comprising used vehicle purchase request identification number 1102, submit time stamp 1104, dealer identification number 1106, dealer stock number 1108, vehicle make 1110, vehicle model 1112, vehicle model year 1114, purchase time frame 1116, buyer information 1118, payment information 1120, priority 1122, privacy 1124, and status 1126. One of ordinary skill in the art will realize that any number of the fields may be broken down into additional sub-fields. Furthermore, similar to the new vehicle purchase request record, any of the fields may be implemented as pointers, encoded fields, and the like. The used vehicle purchase request record may advantageously be stored in the Data Center storage medium 106.

In one embodiment, the process purchase requests module 604 (FIG. 6) may associate the information entered by the buyer through either the generate new vehicle purchase request module 616 or the generate used vehicle purchase request module 618 with their appropriate fields in the respective purchase request record. The process purchase request module 604 may utilize the database access module 608 in storing the purchase request record in the Data Center storage medium 106 (FIG. 1).

In one embodiment, the purchase request record may be completed before being stored in the Data Center storage medium 106. In another embodiment, the purchase request record fields may be stored in the Data Center storage medium 106 as the appropriate information is provided by the buyer.

In another embodiment of the present invention, certain fields comprising the purchase request record may be determined by modules other than the process purchase request module 604 (FIG. 6). For example, the process purchase request module 604 may request the buyer-dealer association module 610 to identify an appropriate dealer to receive the purchase request. Accordingly, the process purchase request module 604 may pass certain purchase request information to the buyer-dealer association module 610 via the communications path 606.

In one example, for a new vehicle purchase request, the buyer-dealer association module 610 may utilize the exclusive dealer regions record to determine a dealer identification number for the purchase request record. In one embodiment, as previously stated, the vehicle make and the buyer zip code may be used to determine the appropriate dealer to receive the new vehicle purchase request, and the dealer identification number may be passed to the process purchase request module 604 for inclusion into the dealer identification number field in the new vehicle purchase request record.

In one embodiment, the buyer-dealer association module 610 may advantageously determine a dealer of a used vehicle. For example, given the vehicle make, the vehicle model, and the vehicle information, the buyer-dealer association module 610 may search the used vehicle inventory to locate a vehicle matching the buyer's requirements. The used vehicle records in the used vehicle inventory may be searched to determine, for example, the dealer identification number and the dealer stock number for inclusion into the used vehicle purchase request record.

In another embodiment, the used vehicle record may also include a unique identification number. The identification number may be created by the Data Center system to identify each vehicle in the Data Center system. This identification number may advantageously be independent of the dealer stock number. This is because the stock number used by one dealer for one vehicle may be identical or very similar to a stock number selected by another dealer for another vehicle. In one embodiment, a record may associate the unique identification number to a dealer offering the vehicle for sale. The buyer-dealer association module 610 may determine the necessary information to identify the dealer, as well as the vehicle, from the identification number.

In an alternative embodiment, the dealer identification number and the dealer stock number may be included into the used vehicle purchase request record by the process purchase request module 604. For example, the dealer identification number and the dealer stock number may be accessed by the process purchase request module 604 at the time the buyer requests the vehicle, or soon thereafter. The process purchase request module 604 may at that time, or soon thereafter, search the used vehicle records stored in the Data Center storage medium 106 to obtain the necessary vehicle information.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of selling aftermarket accessories for a vehicle comprising the acts of:
   creating an exclusive database region for each of a plurality of dealers in a host computer system database;
   generating for each of said plurality of dealers, a separate dealer defined list of aftermarket accessories for a specific model of vehicle, wherein at least some of the aftermarket accessories are not pre-installed by a manufacturer of the vehicle;
   storing each separate dealer defined list of aftermarket accessories in each one of said participating dealers' respective exclusive database regions;
   receiving at said host computer system a request for information regarding said model vehicle directly from a potential buyer via a computer network;
   matching said request from the buyer with a particular dealer;
   displaying a list of aftermarket accessories associated with said particular dealer to said potential buyer via said computer network in response to said request;
   receiving a purchase request from said potential buyer for said model of vehicle, wherein said purchase request includes a request for one or more of said aftermarket accessories selected by said buyer from said list; and
   storing said purchase request in said exclusive database region associated with said particular dealer for access by said particular dealer; whereby a purchase of both said vehicle and at least one of a plurality of said aftermarket accessories for said vehicle are simultaneously initiated.

2. The method of claim 1, wherein said list of accessories is customizable by an associated vehicle dealer.

3. The method of claim 1, wherein one of said accessories comprises an extended warranty.

4. A computer implemented system for selling accessories for a vehicle comprising:
   a computer network having a host computing system coupled thereto;
   a database coupled to said host computing system;
   means for generating for each of a plurality of dealers, a separate dealer defined list of aftermarket accessories, for a specific model of vehicle wherein at least some of the aftermarket accessories are not pre-installed by a manufacturer of the vehicle;
   means for storing each separate list in said database at said host computing system in separate exclusive regions of said database which are assigned to respective ones of said plurality of dealers;
   means for receiving at said host computer system via a computer network a request for information regarding said vehicle directly from a potential buyer;
   means for matching said request from the buyer with a particular dealer; and
   means for displaying a list of aftermarket accessories associated with said particular dealer to said potential buyer via said computer network in response to said request;
   means for receiving a purchase request from said potential buyer for said model of vehicle, wherein said purchase request includes a request for one or more of said aftermarket accessories selected by said buyer from said list; and
   means for storing said purchase request in said exclusive database region associated with said particular dealer for access by said particular dealer; whereby a purchase of both said vehicle and at least one of a plurality of said aftermarket accessories for said vehicle are simultaneously initiated.

\* \* \* \* \*